Dec. 23, 1952     H. JENSEN     2,622,495
OPTICAL SYSTEM FOR INCREASING THE ANGLE OF VIEW OF AERIAL CAMERAS
Filed May 21, 1946     7 Sheets-Sheet 5
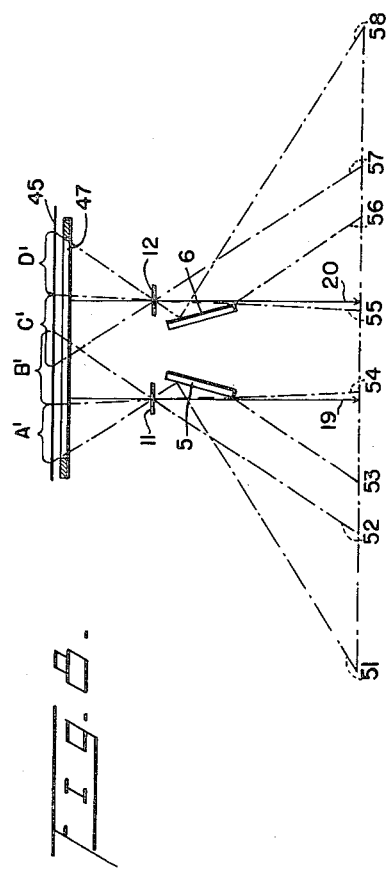
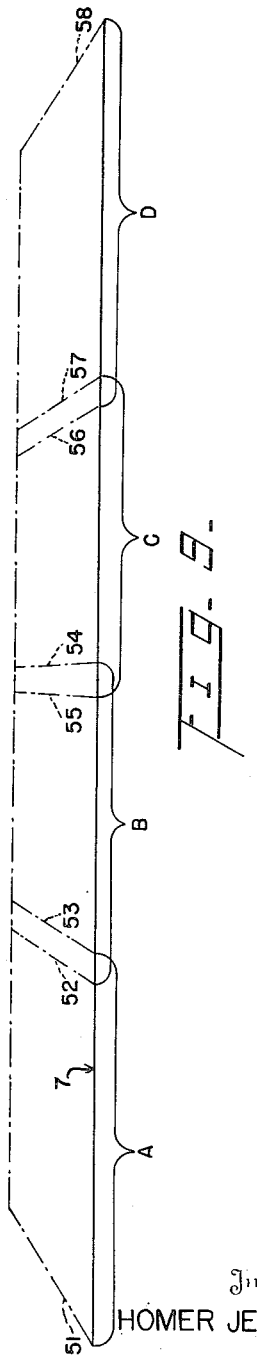
Inventor
HOMER JENSEN Inventor
HOMER JENSEN

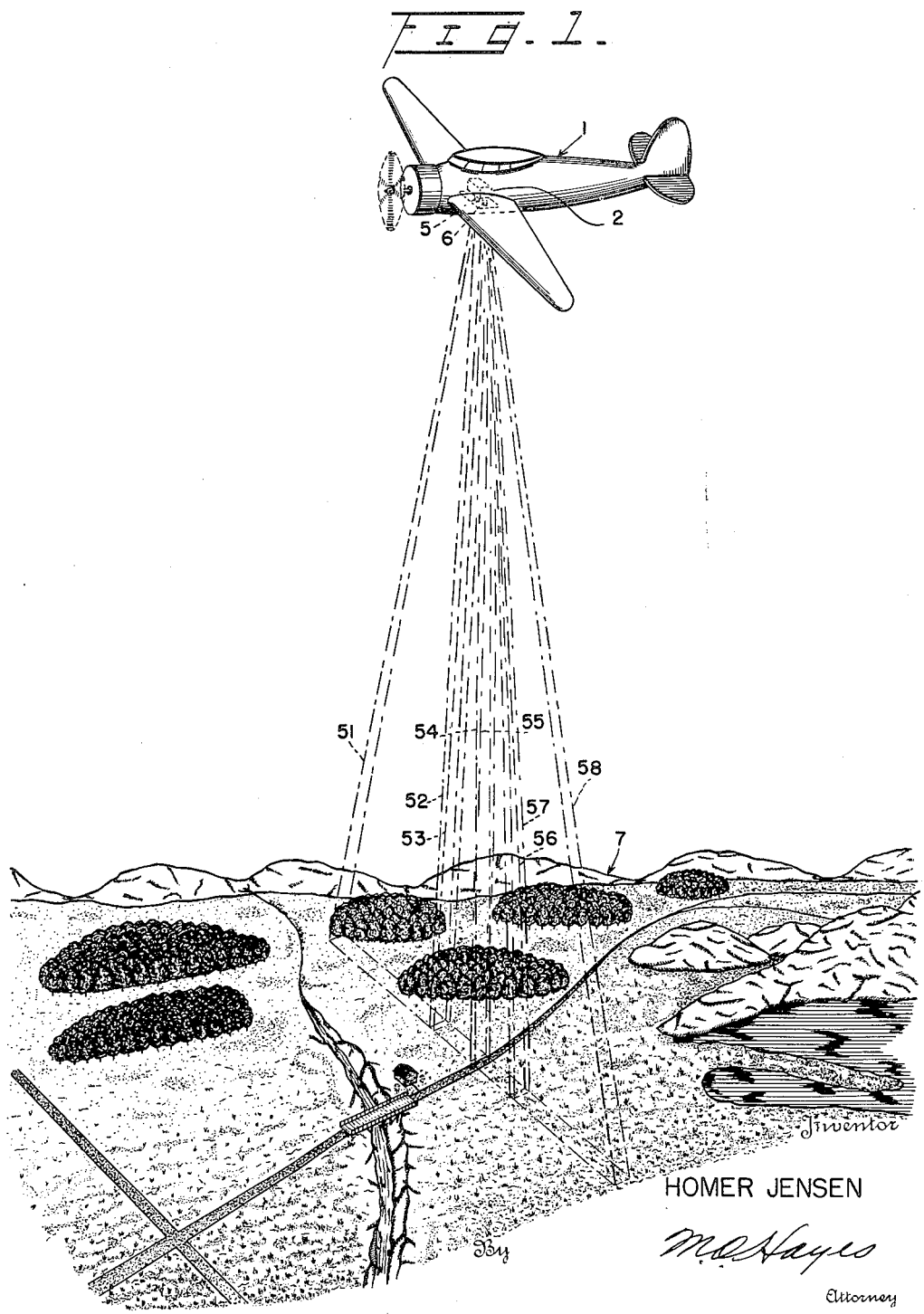

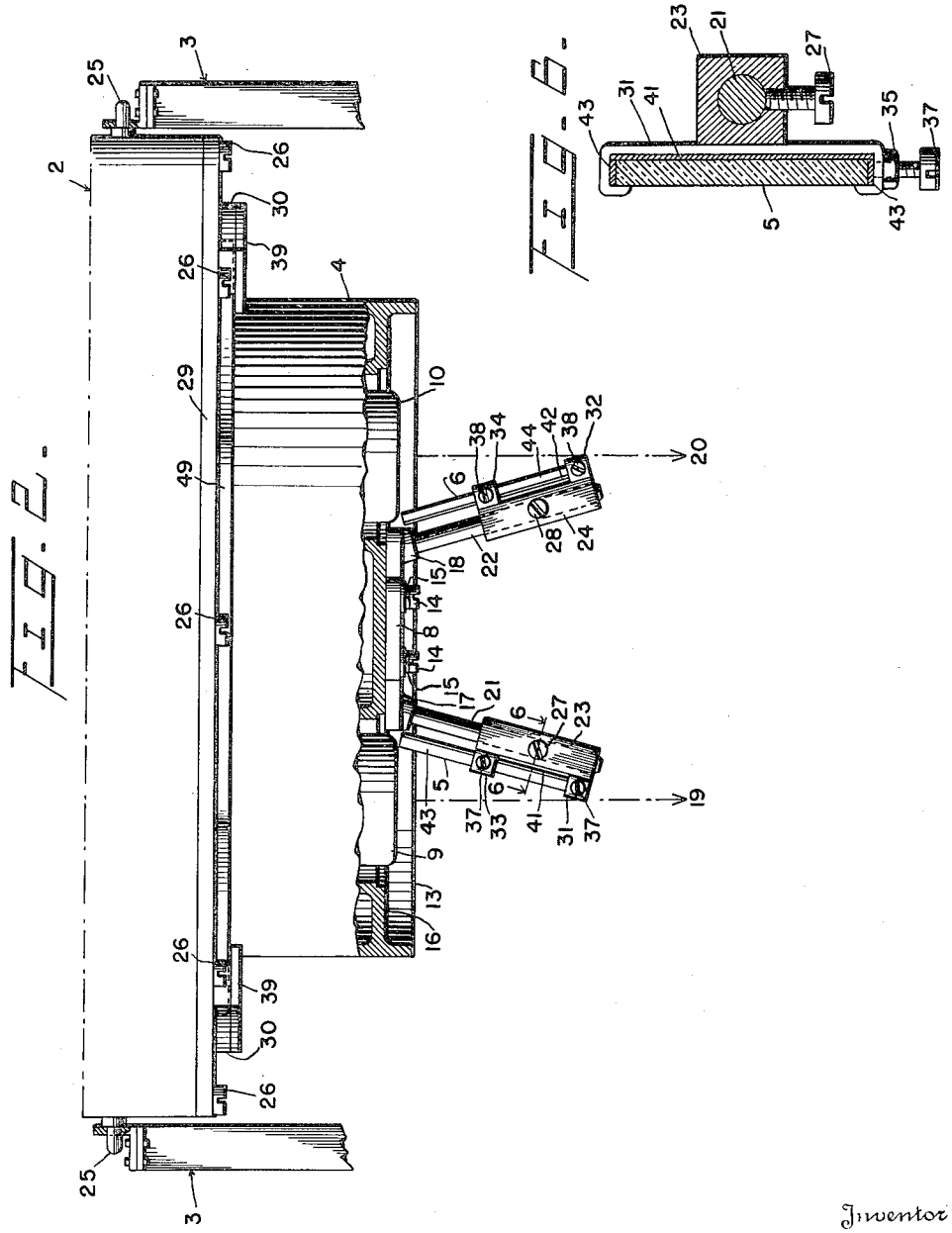

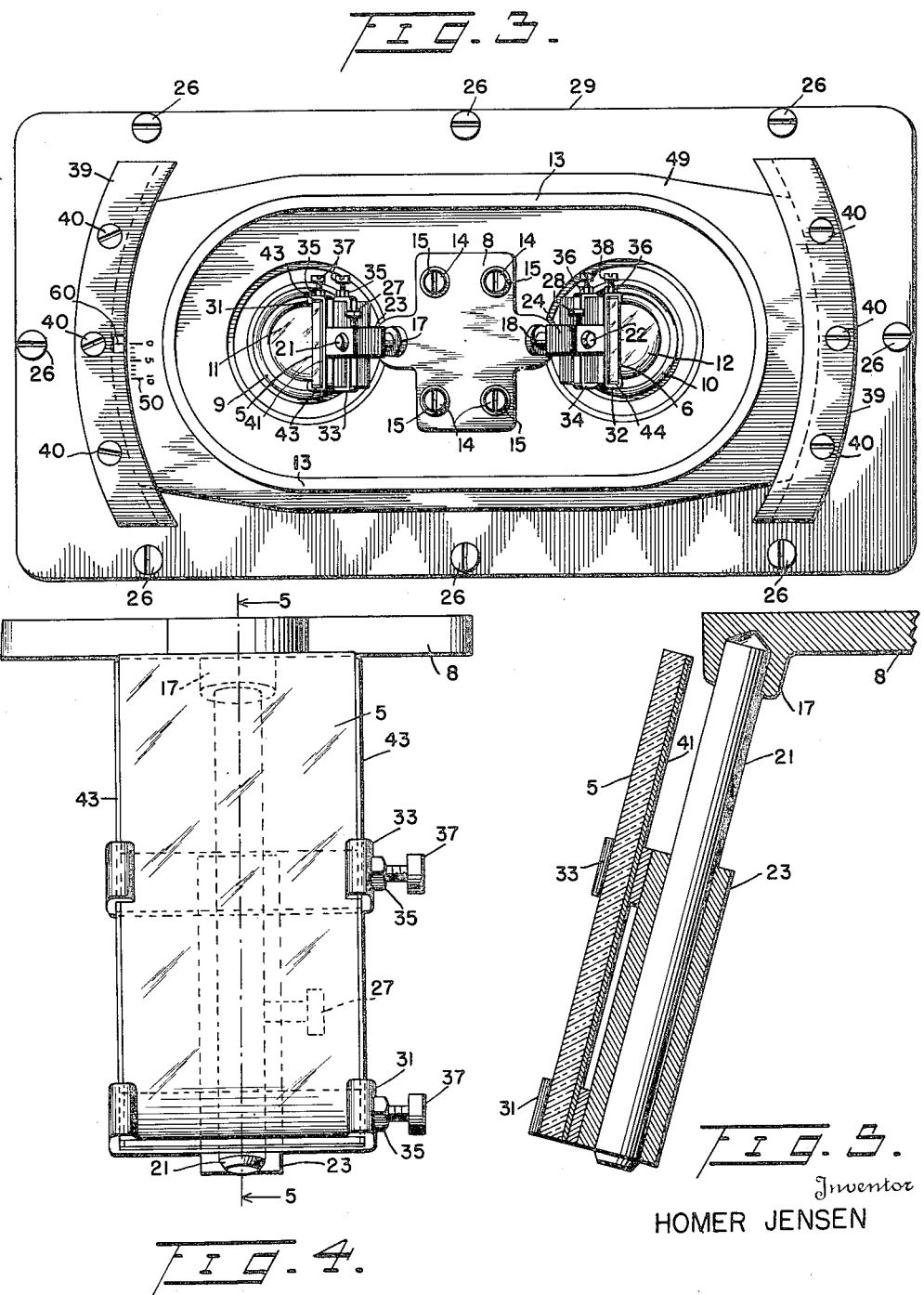

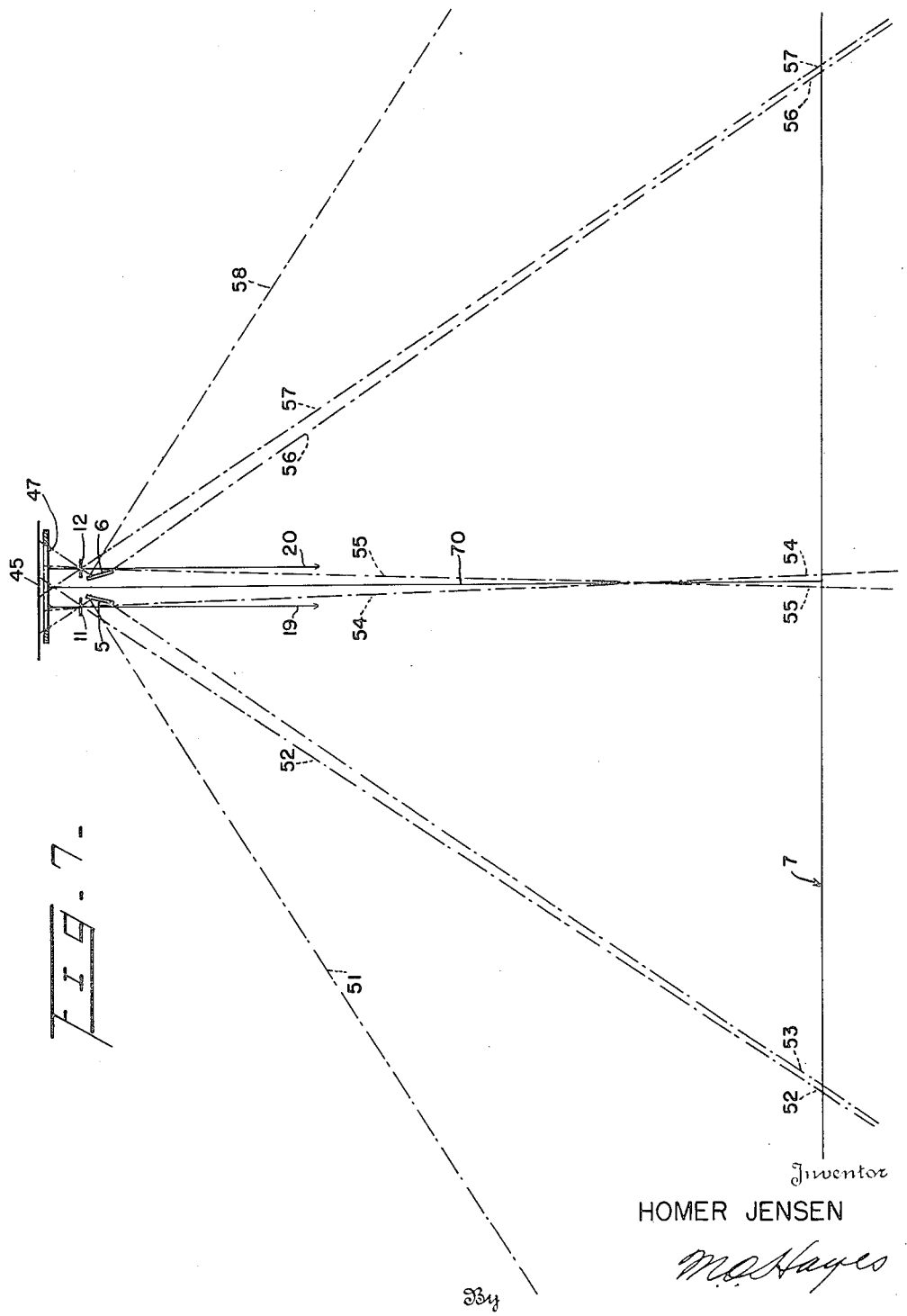

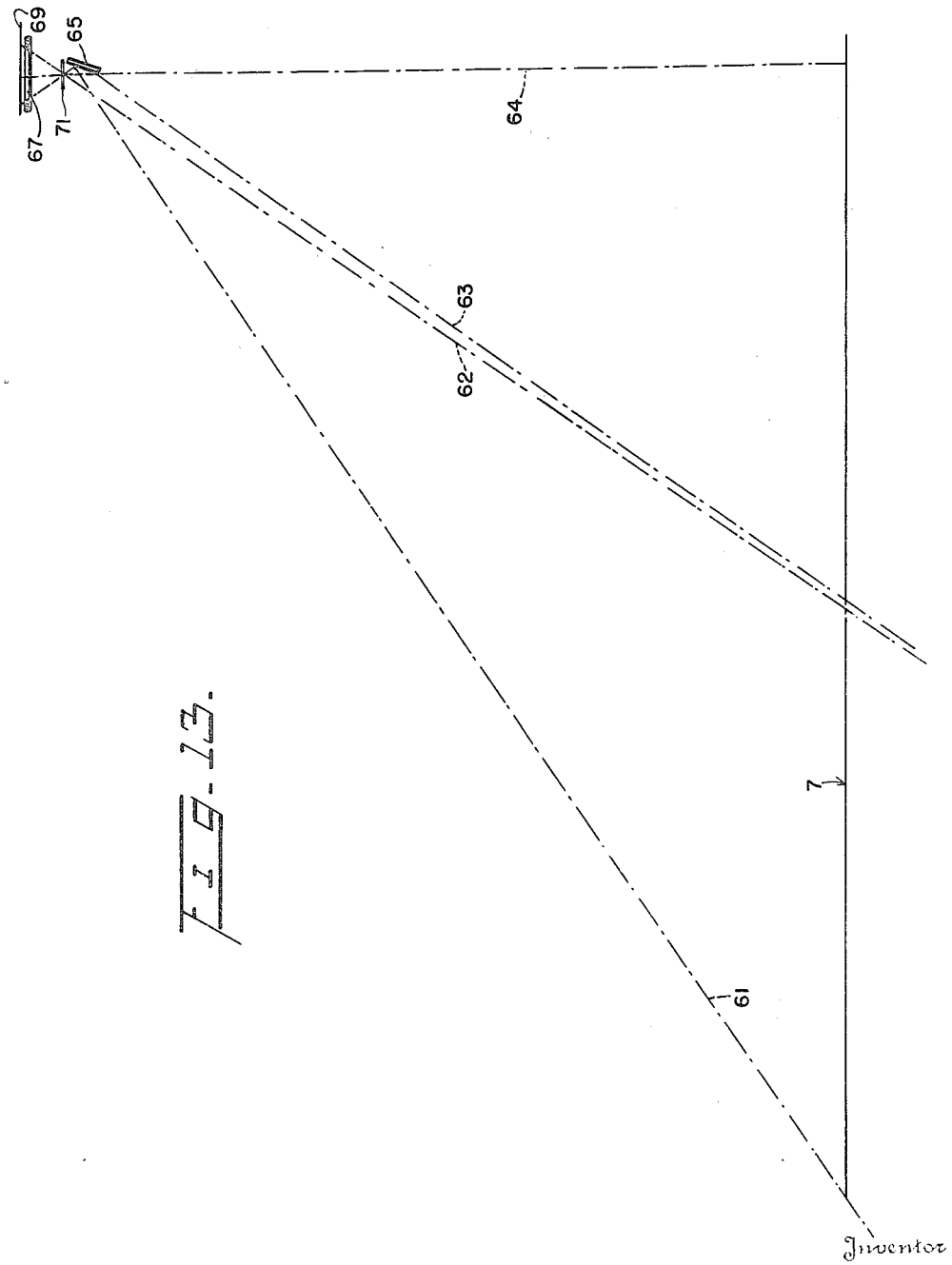

Patented Dec. 23, 1952

2,622,495

UNITED STATES PATENT OFFICE 2,622,495

OPTICAL SYSTEM FOR INCREASING THE ANGLE OF VIEW OF AERIAL CAMERAS

Homer Jensen, Philadelphia, Pa.

Application May 21, 1946, Serial No. 671,340

1 Claim. (Cl. 95—12.5)

(Granted under the act of March 3, 1883, as amended April 30, 1928; 370 O. G. 757)

This invention relates to means for increasing the angle of acceptance, or angle of view, of a camera. More particularly, it contemplates an arrangement in which a mirror is mounted obliquely with respect to the lens axis of the camera and facing the lens, and so positioned with respect thereto as to intersect a preselected portion of the field of view of the lens. So positioned, the mirror will bring onto the camera film images of objects at a wide angle from the normal line of sight or lens axis of the camera, while permitting images of objects in the direct field of view of the lens to also be recorded on the film, when desired.

Whereas the device may be utilized in any number of convenient applications, it is particularly useful in photographing from an aircraft, where it is desirable to have a sufficiently wide view of the terrain to permit ease of location of the objects photographed with reference to the general vicinity, the device being well adapted for use with magnetic exploration apparatus such, for example, as that disclosed in my copending application for Method and Apparatus for Conducting Geophysical Surveys, Serial No. 680,907, filed July 2, 1946, now Patent No. 2,598,697, issued June 3, 1952. When used in aircraft photography, the mirror brings onto the film images of parts of the terrain at wide angles from the plumb line of the aircraft.

The subject invention offers several advantages over other methods of obtaining wide angle photography. A camera having a wide angle lens of sufficient size to give a field a view equivalent to that of the subject apparatus would necessarily suffer some loss of detail and clearness in the recorded image due to the size of the lens, whereas the subject apparatus permits the use of a relatively small angle lens, resulting in sharper detail in the recorded images of the terrain substantially directly beneath the aircraft.

The use of a mirror to divert a portion of the field of view of a lens has the further advantage of permitting a selection to be made of the terrain to be photographed. By selecting the angle with which the mirror face is inclined to the lens axis, the width of the portion of the terrain reflected into the lens, and the distance this terrain lies from the plumb line, can be chosen. Also, the use of a mirror having a face somewhat inclined to the line of flight, permits images of objects somewhat in advance of or behind, the aircraft to be reflected into the camera lens, which, when two lenses and two mirrors are used, permits determination of the range of the aircraft, as will be hereinafter more fully explained.

As indicated above, the invention may be used with cameras having more than one lens, and with stereo-cameras.

One of the objects of the invention is to provide new and improved means for increasing the angle of view of a camera.

Another object is to provide a camera having a mirror in the field of view for reflecting into the camera lens images of objects at a wide angle to the lens axis.

Another object is to provide new and improved photographic means for use on aircraft for determining the position of the objects photographed with reference to a large general terrain.

A further object is to provide new and improved means for continuously plotting the position of an aircraft when it is not directly over a recognizable area, but such an area lies to one side of the aircraft, for example, the positioning of an aircraft flight along a recognizable shore, but out over the water.

A further object is to provide new and improved means for dividing the field of view of a camera lens, a portion of the field being directed to objects immediately before said lens, and a portion to objects at a wide angle to the axis of said lens.

Still a further object is to provide a camera having a pair of lenses, the field of view of each of the lenses being divided into two portions, and a mirror associated with each lens and occupying one of the portions for reflecting into the lens images of objects at wide angles to the lens axis, the remaining portions of the two fields of view being combined to obtain a view similar to the normal view of either lens.

Other objects, advantages, and improvements not hereinbefore set forth will be apparent after a consideration of the following description of the apparatus, taken in conjunction with the accompanying drawings, in which:

Fig. 1 is a general view of one embodiment of the device employing a camera having two lenses, and showing the camera mounted in an aircraft, and the various main portions of the total field of view with respect to the terrain beneath;

Fig. 2 is an enlarged side elevational view, partially broken away, of a portion of the camera, mirrors, and supports therefor;

Fig. 3 is an enlarged bottom plan view of a portion of the camera and mirrors;

Fig. 4 is a detailed view of one of the mirrors of Fig. 2;

Fig. 5 is a cross sectional view of the mirror support of Fig. 4, taken along the line 5—5;

Fig. 6 is a detailed view in section of one of the posts, mirrors, and associated apparatus, taken along the line 6—6 of Fig. 2;

Figure 10:
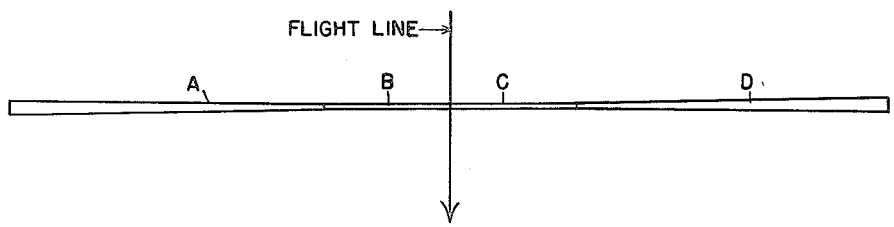
Figure 11:
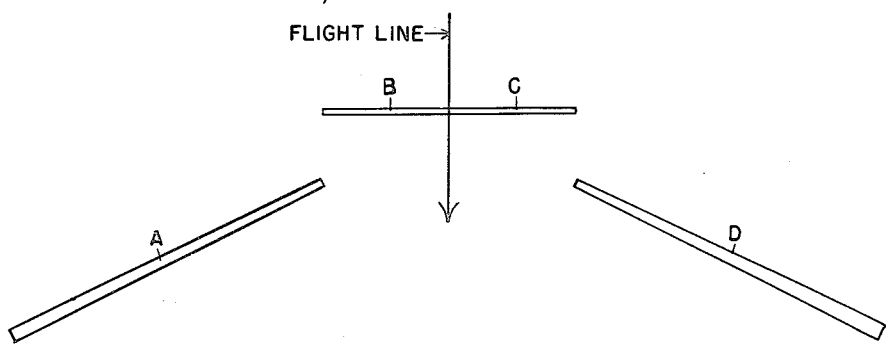
Figure 12:
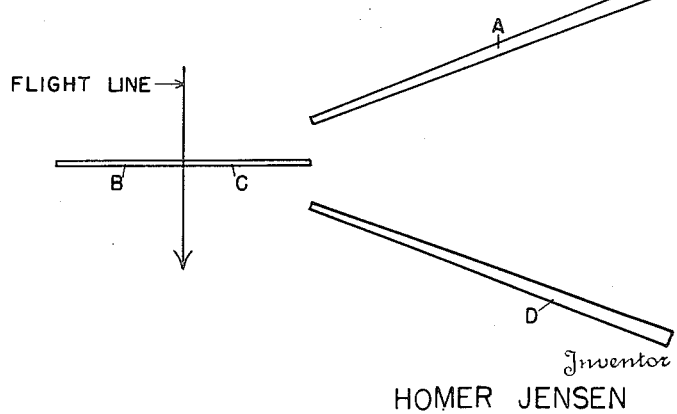

Figs. 7, 8, and 9 are optical diagrams of the mirror system of Fig. 2;

Fig. 10 is an additional optical diagram of the system of Fig. 2, rotated 90 degrees from the diagram of Fig. 9;

Fig. 11 is an optical diagram of the system of Fig. 2 as modified by rotating the mirrors through small angles;

Fig. 12 is an optical diagram of the system of Fig. 2 as modified by directing the two mirror faces toward the same side of the aircraft; and Fig. 13 is an optical diagram of a modification of the device of Fig. 2, in which only one lens and one mirror are employed.

Referring now to the drawings in which like numerals are used throughout to designate like parts, and more particularly to Fig. 1, there is revealed an aircraft generally designated by the numeral 1 in flight over a terrain 7 which it is desired to photograph. The camera, generally designated at 2, is shown in invisible outline positioned within the aircraft, has a pair of lenses (Fig. 2), and has mirrors 5 and 6 attached thereunder in predetermined positions with respect to the lenses, as will be subsequently more fully explained.

The aircraft is seen to have an opening in the body directly beneath the camera, so that the fields of view of the lenses are unobstructed. The lines emanating from the camera and mirrors define the major portions of the total field of view of the camera, as will be hereafter more fully explained, the two central portions of the field of view being those directly present to the lenses, the portions lying on either side being those reflected into the lenses by the mirrors. As will be subsequently apparent, it is desirable to have slight overlaps between the various portions, overlapping lines being revealed in Fig. 1 in the interest of clearness.

Any convenient means (not shown in Fig. 1) may be provided for mounting the camera in the desired position.

Any suitable camera may be used, for example, a continuous strip camera known in the trade as a Sonne S-7, manufactured by the Chicago Aerial Survey Company. This camera is characterized by having a narrow film slit or optical opening, resulting in a field of view which is quite narrow in one dimension.

Referring now to Fig. 2, the camera 2 is shown to have studs 25 extending from the sides thereof, these studs resting in slots in cross supports 3 of a main supporting framework of any convenient design. The camera has a large oval-shaped lens housing 4 having an extended flange 49 and an overhanging lip 13, and having disposed therewithin lens barrels 9 and 10 containing lenses 11 and 12 respectively, Fig. 3. Above the lenses (as viewed in Fig. 2) is an image slit, and above the slit a film, these not being shown. It is understood that the camera 2 may contain any convenient means for moving the film at uniform speed across the image slit, and means of conventional design for adjusting the speed of the film into correspondence with the speed of the aircraft.

The lens housing 4 and flange portion 49 are adapted to be shifted in position with respect to the plate 29, which is removable from the main body of the camera, being adapted to be fixed to the remainder of the camera by screws 26. Adjacent each end of the flange 49 with a small intervening space between is a spacer member 30, these members being positioned beneath (as viewed in Fig. 3) two curved retaining sectors 39, which are fixed to plate 29 by screws 40, Fig. 3, the spacer members 30 also being bored to receive screws 40, the spacer members and retaining sectors being held fixedly in place by the aforementioned screws. Upon one end of flange 49 is a scale 50, in cooperative proximity to an indicating or indexing marker 60 on the adjacent retaining member 39. The scale and marker are provided so that the line between lens axes can be shifted somewhat with respect to the camera axis if desired, when, for example, it is wished to orient the lenses in a certain manner with respect to the line of flight, the retaining members 39 acting when firmly fixed by screws 40 to also fix the flange 49 and lens housing 4 in preselected position.

Upon the face 16 of the lens housing, between the lens barrels 9 and 10, is mounted a flat plate 8 composed of aluminum or other suitable material, fixed to the lens housing 4 by screws 14 having lock washers 15. Disposed at each end of the plate 8 near the lens barrels 9 and 10 are a pair of lugs or bosses 17 and 18 respectively, which may be formed integral with the plate, and which support a pair of posts or uprights 21 and 22 respectively, these posts being inclined somewhat at an oblique angle to the face of the plate 8, for reasons which will be hereafter apparent, the posts 21 and 22 being formed of aluminum or other suitable material, and positioned substantially on a line between the lens axes.

Mounted upon each of the posts 21 and 22 are blocks 23 and 24 respectively, composed of aluminum or other suitable material, having bores therein, and adapted to be moved longitudinally upon the posts, and to be rotated about the axes thereof. Set screw means 27 and 28 are provided for fixing the blocks 23 and 24 in preselected positions upon the post 21 and 22 respectively.

The block 23 and block 24 each has fixed thereto a pair of clamps for holding mirrors 5 and 6 respectively, block 23 being provided with an upper clamp 33 (as viewed in Fig. 2) and lower clamp 31, block 24 being provided with upper clamp 34 and lower clamp 32, the clamps being fixed to the blocks in any convenient manner, such as by welding. Set screw means 37 with associated locking nuts 35, Fig. 3, are provided with clamps 33 and 31 for holding mirror 5 securely in a desired position in the clamps, and set screw means 38 having associated locking nuts 36 are provided with clamps 34 and 32 for holding mirror 6 securely in a desired position in the clamps.

If desired, in order to prevent the mirrors from coming into direct contact with the metal and thereby being subjected to chipping or breaking, lining strips of relatively soft material may be provided along the backs and sides of the mirrors, such, for example, as back strips 41 and 42 for mirrors 5 and 6 respectively, and pairs of side strips 43 and 44 for mirrors 5 and 6 respectively.

Referring now particularly to Fig. 3, which shows an enlarged bottom plan view of the device, the positions of the mirrors with respect to their associated lenses are revealed with precision and clearness. The near edges of the faces, at the ends of the mirrors farthest from the lenses, are seen to lie slightly to one side of the lens axis, for reasons which will be subsequently explained.

Fig. 4 shows the face of the mirror 5, as it appears when mounted in the aforedescribed manner.

Referring now to Fig. 5, which shows a longitudinal cross sectional view of the post 21 and block 23, the post is seen to extend into a bore in the lug 17, and may be securely fixed therein in any convenient manner.

Fig. 6, to which reference is now made, is a transverse cross sectional view of the post 21 and block 23, showing with particular clearness the manner in which the mirror 5 is mounted in the clamps, one clamp being shown at 31, side strips 43 and back strip 41 being clearly shown.

Reference is made now to Fig. 7, which is an optical diagram illustrating the operation of the apparatus of Fig. 2, and which should be studied in conjunction with Figs. 8 and 9, all of these figures representing incompletely the total field of view of the camera, several figures being necessitated by the limitations of space. Fig. 7 shows the complete field of view at the camera and a portion of the field at the terrain 7; Fig. 8 shows the complete field in the region of the camera; Fig. 9 shows a complete field at the terrain, being considerably reduced in scale from Fig. 8.

It will be recalled that one of the stated objects of the invention was to provide new and improved photographic means for use on aircraft for locating or positioning the area photographed in a large section of the general surrounding terrain. To this end, the present invention provides an arrangement in which approximately half the field of view of each lens is directed at the portion of the terrain which it is desired to photograph with particular clearness, while approximately half the field of view of each lens, as determined by the position of the mirrors shown and described above, is directed toward objects at wide angles to the lens axis. In this way, when used in aircraft photography, the mirrors bring onto the film images of parts of the terrain at wide angles from the plumb line of the aircraft.

In Figs. 7, 8 and 9, the manner in which the mirrors accomplish this is clearly revealed. The aforementioned lenses 11 and 12 may each be of the double lens type having an adjustable diaphragm disposed between the two sections for regulating the amount of light passing to the film. In the subject apparatus the openings of the diaphragms may be relatively small. It is observed that the two lenses 11 and 12 produce images on adjacent portions of the film 45. The axis of lens 11 is shown at line 19, and passes slightly to the left of the lower end of mirror 5 (as viewed in Fig. 8). Assuming that the mirror faces are positioned as in Figs. 2 and 8, that is, substantially parallel to the line of flight, the various other lines represent the paths of light rays which define the various portions of the field of view, and the various portions of the total image recorded on the film 45. Line 51 represents the path of a light ray which strikes the film at the outer end (left end as viewed in Fig. 8), of the film slit 47 after passing through the camera lens 11. Originating on the ground or terrain at a considerable distance from the plumb line 70 of the aircraft, it passes through the center of the lens, after being reflected at a comparatively large angle from the mirror 5.

The line 54 represents the path of rays which just pass the tip of the lower end of the face of mirror 5, and pass through the center of the lens, and is seen to make a very small angle with the optical axis 19 of lens 11.

Line 53 represents the course which a light ray, originating on the terrain at the point shown, Fig. 7, would follow. After reflection from mirror 5, it travels in a line approximately parallel to line 54, reaching the film at substantially the same point as the rays following line 54. It is observed, then, that all light rays striking the mirror 5 (that is, all those which register on the film) fall on the portion of the film designated A', Fig. 8, and originate from that portion of the field of view designated at the terrain by the letter A, Fig. 9.

Line 52 represents the path of light rays which pass through the center of the lens 11 and reach the film at approximately the center of the film slit.

The portion of the field of view designated at the terrain by the letter B, Fig. 9, represents that directly present to the lens, and is recorded on that portion of the film designated B', Fig. 8.

It is noted that portions A and B of the field of view, that is, the reflected portion and the directly apprehended portion, overlap somewhat, so that both portions A' and B' of the film 45 will contain images of that portion of the terrain lying between the lines 52 and 53, but that these images will be reversed on the two film portions. If mirror 5 is mounted so that the lines 52 and 53 are slightly converging, the portion of overlap, when the lines reach the terrain, will be small, the amount of overlap depending upon the angle of convergence of the lines and the height of the aircraft above the earth. The overlapping of the various portions of the total field of view is a desirable feature of the invention in most applications. The place, and the distance from the plumb line, where section A', called the wing picture, begins, will then be shown on section B', and possibility of a gap between the two sections is obviated.

The arrangement of mirror 6 with respect to lens 12 may be similar in all respects to the aforedescribed arrangement of mirror 5 and lens 11, the axis of lens 12 being shown by line 20, the lines 55, 56, 57 and 58 defining the two portions of the field of view of lens 12, the directly observed portion C and the reflected portion D, lines 55, 56, 57 and 58 corresponding to aforedescribed lines 54, 53, 52 and 51 respectively, film portions C' and D' corresponding to film portions B' and A' respectively.

It is observed that the two lines 54 and 55 are slightly converging, and may cross, Fig. 7, before reaching the terrain 7, so that at the ground there may be a slight overlap of portions B and C of the total field, the amount of overlap at the terrain depending upon the angle of convergence and the height of the aircraft. A corresponding duplication of images occurs on film sections B' and C'.

It is seen then, that a mirror, for example, mirror 5, positioned as shown and described with respect to the lens 11, results in an image of two distinct portions being recorded on the film 45, a portion directly present to the lens, portion B', and a reflected portion at a wide angle to the lens axis, portion A'. The width of the portion A of the field of view at the terrain may be determined in part by the size of the oblique angle which mirror 5 makes to the lens axis; the larger the angle, the farther from the plumb line the point on the terrain at which line 51 originates. Two mirrors arranged symmetrically as in Fig. 2, give the symmetrical total field of view of Figs. 7, 8 and 9.

It is observed that images of objects in those portions of the fields of view of lenses 11 and 12 which are directed forward in normal fashion, fall in adjacent positions on the film 45, being designated B' and C'. The two portions, taken together, with the exception of the overlap, give a view substantially similar to the direct view which would have been obtained from either lens, had its field been undivided and unobstructed, except that the direct view is in two sections B' and C', which are reversed from their normal positions, that is, objects directly in the center of the total field, or on the plumb line, lie at the outside edges of film portions B' and C'.

Mirrors 5 and 6 may if desired, be tilted at different angles, should the application of the device make this desirable. The angles need not be the same for the two mirrors.

Reference is made now to Fig. 10, which shows a plan view of the total field of view of the camera at the terrain as seen from the aircraft, the reflected portions A and D providing the aforementioned wing pictures on the film.

It has been assumed throughout the foregoing discussion that the mirrors were positioned on their supports so that the planes of the mirror faces were parallel to the line of flight. As was pointed out previously, the blocks 23 and 24 which support mirrors 5 and 6 respectively are adapted to be rotated about their supporting posts 21 and 22 respectively.

When the mirrors are turned forward, so that they face slightly in advance of the position of the aircraft, the images of the terrain obtained on the film represent portions of the terrain positioned with respect to the aircraft similar to those of Fig. 11, which represents in a plan view the location of the terrain photographed when the mirrors are turned forward angles of substantially 25 degrees. The wing pictures, or the images reflected into the lenses by the mirrors, are now of a portion of the terrain in advance of the position of the aircraft.

Such an arrangement or use of the device has the advantage of permitting the instantaneous position of the aircraft to be determined by means of intersecting ranges from points simultaneously photographed in the two wing pictures.

A further modification of the device will cause the pattern of the terrain instantaneously photographed in the wing pictures to be as in Fig. 12, in which both wing sections A and D of the total field of view lie on the same side of the camera and aircraft, but are inclined at an angle to each other. This arrangement permits fixing the instantaneous position of the plumb point beneath the aircraft by means of ranges on points simultaneously photographed, when the aircraft is over water, but within view of a recognizable shore on one side.

When it is desired to photograph portions of the terrain positioned with respect to the aircraft as in Fig. 12, some modification of the structure of Fig. 2 is essential. The post 21 must be moved to the opposite side of lens 11, and positioned obliquely with respect to face 16 of lens housing 4 with its axis substantially parallel to that of post 22, any suitable mounting means being provided. Mirror 5 will then be rotated somewhat to the rear, mirror 6 somewhat forward. The instantaneously photographed pattern of the terrain will then be as in Fig. 12. It should be noted, however, that whereas in the arrangement of Fig. 8, the portions of the total image on film 45, A', B', C' and D', comprise respectively a wing picture, a center picture, a center picture, and a wing picture, if the post 21 is shifted to the opposite side of lens 11 and positioned parallel to post 22, the portions of the film, reading from left to right, will contain in the following order a center picture, a wing picture, a center picture, and a wing picture.

The invention is also suitable for use with cameras having only one lens. Fig. 13 is an optical diagram of such a system, the film slit being shown at 67 and the film at 69, the mirror 65 performing a function similar to that of aforedescribed mirror 5, lens 71 performing a function similar to that of aforedescribed lens 11, lines 61, 62, 63 and 64 corresponding to lines 51, 52, 53, and 54 respectively of Figs. 7, 8 and 9.

Whereas in the subject embodiments, the mirrors have been shown and described as occupying substantially half the fields of view of the lenses, it is of course understood that they could, if desired, occupy any other desired portions.

Whereas the field of view is shown as directed downward, it could of course be directed in any chosen direction.

Whereas the device has been shown and described with especial reference to its use with aircraft photography, it may be used in any application where it is desired to widen the field of view of a camera, or to direct portions of the field of view of the camera lens in two different directions.

Whereas the invention has been shown and described with particular reference to its use with a continuous-strip camera, it may of course be used with any desired type of camera.

Furthermore, whereas the invention has been disclosed herein with reference to two embodiments thereof, it will be understood by those skilled in the art to which the invention pertains, after understanding the invention, that various modifications of form or structure may be made without departing from the spirit or scope of the invention, and it is therefore intended to include in the appended claim all such modifications and equivalents, both mechanical and optical.

This invention may be manufactured and used by or for the Government of the United States of America without the payment of any royalties thereon or therefor.

What is claimed as new and desired to be secured by Letters Patent of the United States is:

In apparatus for widening the field of view in aerial photography, a continuous strip camera mounted on the supporting aircraft and having a pair of spaced downwardly directed lenses disposed transversely of the path of travel of the aircraft, said lenses having the axes thereof mutually parallel, a pair of mirrors disposed respectively below mutually adjacent halves of said lenses, the reflecting surfaces of said mirrors being inclined at acute angles with respect to said lens axes, the lower edges of said mirrors being respectively disposed adjacent the lens axes and the upper edges being respectively disposed adjacent the inner edges of the lenses, said mirrors being set at angles to bring images of strip portions of the earth's surface reflected on said camera film by said mirrors at least into abutting relation with respect to images of the strip portions of the earth's surface directly viewed by the outer halves of the fields of view of the lenses individual thereto, and means for mounting said mirrors on said camera rigidly at said angles and for slidable movement of the mirrors thereon in the plane of the reflecting surfaces thereof toward or away from said lens axes, the lower extremities of said mirrors being spaced from said lens axes a predetermined amount in accordance with the altitude of survey of the aircraft and sufficient to bring said directly viewed strip portions at least into mutually abutting relation and to retain said outer strip portions in said abutting relation therewith.

HOMER JENSEN.

REFERENCES CITED

The following references are of record in the file of this patent:

UNITED STATES PATENTS

| Number | Name | Date |
| --- | --- | --- |
| 1,149,122 | Fuller | Aug. 3, 1915 |
| 1,273,183 | Ramsay | July 23, 1918 |
| 1,438,906 | Douglass | Dec. 12, 1922 |
| 1,477,999 | Douglass | Dec. 18, 1923 |
| 1,479,211 | Ames, Jr., et al. | Jan. 1, 1924 |
| 1,952,337 | Simjian | Mar. 27, 1934 |
| 2,194,059 | Valentine | Mar. 19, 1940 |
| 2,352,570 | Seely | June 27, 1944 |
| 2,433,534 | Sonne | Dec. 30, 1947 |
| 2,437,159 | Herbert | Mar. 2, 1948 |

FOREIGN PATENTS

| Number | Country | Date |
| --- | --- | --- |
| 338,386 | France | Mar. 21, 1904 |
| 213,001 | Great Britain | Mar. 24, 1924 |